United States Patent Office 2,950,209
Patented Aug. 23, 1960

2,950,209

THERMOFLUID VEHICLES

Lewis C. Hoffman, Scotch Plains, N.J., assignor to E. I. du Pont de Nemours and Company, Wilmington, Del., a corporation of Delaware No Drawing. Filed Apr. 2, 1958, Ser. No. 725,783

2 Claims. (Cl. 106—230)

This invention relates to new and improved thermofluid vehicles useful for the preparation of ceramic coating compositions.

The decoration of ceramic or metal surfaces with vitreous enamel coatings of any desired color is customarily carried out by the squeegeeing of a colored enamel coating composition, composed of a vehicle and a finely divided vitreous color enamel, through a screen stencil onto a ceramic or metal article and firing the coated article to fuse the enamel in the coating. In order that such decorating method may be carried out rapidly, the art has developed thermofluid vehicles for such colored enamel compositions. Such thermofluid vehicles melt at a temperature slightly above room temperature and freeze rapidly when the squeegeed paste contacts a ceramic or metal surface at about room temperature.

Thermofluid vehicles used in the art are of two general types, those comprised of a combination of a thermoplastic resin and a wax as exemplified in U.S. Patents Nos. 2,607,701, 2,607,702 and 2,682,480, or those comprised of an all-wax medium as exemplified in U.S. Patents Nos. 2,617,740 and 2,823,138.

Although both types of thermofluid vehicles are quite useful, they have not proven altogether satisfactory. As heretofore pointed out, there are so many required characteristics of a satisfactory vehicle for enamel coating compositions that to produce a completely suitable composition is very complicated. One of the outstanding objectionable characteristics of both types of previously known thermofluid vehicles is the retention of screen markings on the fired enamel compositions. Thermofluid vehicles must retain a required stiffness or viscosity upon being submitted to enamel firing temperatures to prevent their running from the desired coating area. Consequently such enamel compositions will retain screen markings present as a result of their freezing upon contact with the relatively cold surface to be decorated.

It is an object of this invention to provide new and improved thermofluid vehicles.

It is another object of this invention to provide thermofluid resin-wax and all-wax vehicles for enamel coating compositions which will not run upon firing of the enamel coating compositions but will be smoothed out to eliminate any screen markings or other irregularities on the coating surfaces.

Other objects of the invention will appear hereinafter.

The objects of this invention may be accomplished by the addition to a thermofluid vehicle of either the resin-wax or all-wax types of an anionic surface active agent taken from the group consisting of alkali, alkaline-earth ammonium and amine salts of the sulfate and sulfonate esters of a hydrophobic organic compound having 8 or more carbon atoms. The addition to thermofluid vehicles of between 0.5% and 15% by weight of the vehicle of such anionic surface active agent has been found to make the vitreous enamel color coating composition prepared therewith self-smoothing to eliminate any roughness or screen marking in the applied coating compositions without imparting to the composition any tendency to run during firing of the coated article.

The following table lists numerous examples of the aforementioned anionic surface active agents suitable for use in accordance with this invention.

TABLE I

| Trade Name | Name of Manufacturer | Chemical Name |
|---|---|---|
| Igepon CN42 | Antara Chemicals, Division of GA&F | Sodium N-hexadecanoyl-N-cyclohexyl taurate. |
| Aerosol 22 | American Cyanamid | n-octadecyl tetrasodium 1,2,dicarboxyethyl sulfosuccinamate. |
| Aerosol OS | American Cyanamid | Sodium isopropyl naphthalene sulfonate. |
| Alkanol B | Du Pont | Sodium alkyl naphthalene sulfonate. |
| Duponol 80 | Du Pont | Octyl alcohol, sodium sulfate. |
| Nekal WS99 | Antara | Sulfonated aliphatic polyester. |
| Petrowet WN | Du Pont | Sodium sulfate of a saturated long chain alcohol. |
| Santomerse 85 | Monsanto | Alkyl benzene sodium sulfonate. |
| Sherosope T | Bryton Chemical | Sodium, petroleum sulfonate (molecular weight 500+). |
| Sorbit AC | Geigy | Butyl naphthalene, sodium sulfonate. |
| Tergitol 7 | Carbide & Carbon Chemical | Sodium heptadecyl sulfate. |
| Tergitol 08 | Carbide & Carbon Chemical | Sodium-2 ethyl hexyl sulfate. |
| Aerosol MA | American Cyanamid | Dihexyl sodium sulfosuccinate. |
| Aerosol AY | American Cyanamid | Diamyl sodium sulfosuccinate. |
| Ammonium Lorol Sulfate | American Alcolac | $NH_4$ salt of half sulfate ester of cetyl-stearyl alcohol. |
| Alipal CO433 | Antara | Na salt of sulfate ester of an alkyl phenoxy polyoxyethylene ethanol. |
| Blancol | Antara | Na salt of a sulfonated naphthalene condensate. |
| Belloid TD | Geigy | Polymethylene bis naphthalene sodium sulfonate. |
| Diethanolamine Lorol Sulfate | American Alcolac | Diethanolamine salt of half sulfate ester of cetyl-stearyl alcohol. |
| Igepon T77 | Antara | Sodium-N-abietoyl-N-methyltaurate. |
| Magnesium Lorol Sulfate | American Alcolac | $Mg^2$ salt of half sulfate ester of cetyl-stearyl alcohol. |
| Potassium Lorol Sulfate | American Alcolac | Potassium salt of half sulfate ester of cetyl-stearyl alcohol. |
| Sulfanole FAF | Warwick | Sodium salt of a higher alcohol sulfate. |
| Tergitol 4 | Carbide & Carbon Chemical | Sodium sulfate derivative of 7-ethyl-2 methyl-undecanol. |
| Tergitol EH | Carbide & Carbon Chemical | Sodium 2-ethylhexene sulfonate. |
| Ultrawet K | Atlantic Refining Co | Sodium salt of a sulfonated petroleum hydrocarbon ($C^{16}$). |
| Duponol ME | Du Pont | Sodium sulfate, lauryl alcohol. |
| Igepon TN74 | Antara | Sodium-N-oleic acid-N-methyl taurate. |

Finely divided vitreous enamel is normally agglomerated in a thermofluid vehicle. This may be readily seen in a microscope under suitable magnification. The particles are collected into aggregates and when two particles contact each other, they tend to stick together. Even when they are set in motion, they move as large collective groups and not as individuals. It is desirable that they act as individuals because in the transient stage of melting during firing of a thermofluid decoration, they will tend to level out the mesh marks in the print proportional to the extent of dispersion present. I accomplish this dispersion by the addition to the thermofluid vehicle of an anionic surface active agent of the type hereinabove described. The surface active agents may be prepared in diverse ways leading to different bonds between the hydrophilic sulfonate or sulfate group and the hydrophobic group. The examples in Table I include anionic surface active agents obtained by direct esterification of acids and esters, amides, alcohols, olefins, alkanes, aromatics and ethers. It is well known to sulfate or sulfonate an intermediate and then couple this intermediate to a long chain compound to yield diverse linkages.

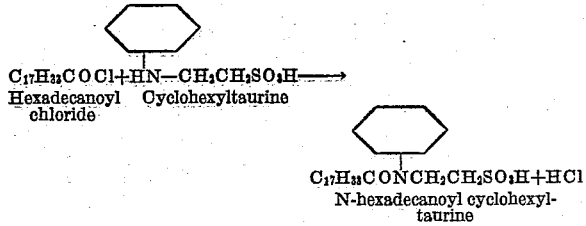

No surface active agents having less than 8 carbon atoms in the chain were found to be useful.

The amount of agent for noticeable effect is 0.5% to 1% of the vehicle. Most of the agents are liquids or soft solids and excessive amounts tend to cause reduction in solidification temperature of the vehicles. I have found about 5% to be optimum and 15% to be a safe maximum dependent, of course, on the physical nature of the agent.

As shown in the patents above referred to, both the resin-wax and the all-wax types of vehicles are basically comprised of a fusible substance having a melting point of between about 47° C. and 110° C. and having the property of rapidly solidifying at room temperature. Such vehicles may also in some cases contain small amounts of a solvent for said resin or wax and optionally small amounts of modifying substances.

Resin-wax types of vehicles contain a thermoplastic resin in combination with a wax or wax-like material. As resins the vehicle may contain rosin, abietic acid, hydrogenated rosin, dimerized rosin, rosin esters, polymerized resin acids, resinous chlorinated diphenyls, butyl methacrylate, Pliolite, ethyl cellulose, or the like. As waxes may be mentioned vegetable waxes such as carnauba wax or candelilla wax, or other waxes such as beeswax, paraffin wax, microcrystalline wax, or spermacetic wax. As wax-like materials may be named palmitic acid, stearic acid, solid soaps, or synthetic waxes such as wax-like amides and amines or polyethylene glycol, often referred to as "Carbowax." Such resins and waxes are mixed in specific proportions in a known manner to obtain the desired characteristics of melting point, rapidity of hardening, viscosity, volatility during firing and the like. In the case of all-wax types of vehicles, the thermoplastic resins are omitted and the vehicle is basically composed of waxes, both natural and synthetic, and thickening wax-like materials such as polyethylene glycols with wax solvents such as saturated monohydroxy alcohols of 12 to 18 carbon atoms, monohydric carboxylic acids of 12 to 18 carbon atoms or paraffin wax having a melting point of about 45 to 75° C.

Modifying agents such as soya lecithin, phosphorated tall oil or the like may be added to impart resistance to moisture condensation, or urea or diphenyl to impart toughness to the coatings.

In preparing the colored vitreous enamel coating compositions, the above-described thermofluid vehicles are mixed with vitreous enamel colors in proportions of between 1:1 to 6:1 of enamel colors to vehicle. The vitreous enamel colors generally consist of 5% to 20% of inorganic oxide pigments and 95% to 80% of finely divided glass frit. The glass frit may be lead, cadmium, antimony or other metal borosilicates.

The following examples illustrate preferred vehicles and colored vitreous enamel coating compositions of this invention and methods for their preparation. In all of the examples for production of the color compositions the vehicle components were melted while stirring at a temperature of about 100° C., and the molten composition poured over the particulate vitreous enamel color composed of 15% finely ground inorganic oxide pigment and 85% lead borosilicate frit and the entire mass held at about 100° C. until thoroughly mixed. In all of these examples the presence of the anionic surface active agent contained therein was found to very materially improve the self-smoothing character of the enamel coating compositions upon firing.

*All-wax vehicles*

EXAMPLE 1

| | |
|---|---|
| "Carbowax" 6000 (polyethylene glycol having an average molecular weight of about 6000) percent | 40 |
| Stearyl alcohol do | 55 |
| Sodium - N - hexadecanoyl - N - cyclohexyl taurate percent | 5 |
| Preferred mixture proportion vehicle to vitreous enamel color | 1:5 |

EXAMPLE 2

| | |
|---|---|
| "Carbowax" 6000 (polyethylene glycol having an average molecular weight of about 6000) percent | 30 |
| "Aldo 64" (a mixed fatty alcohol made and sold by Archer-Daniels-Midland Corp. and containing $C_{16}$ 24.3%—$C_{18}$ 68.6%—$C_{20}$ 7.1%; M.P. 54–57° C.) percent | 65 |
| n-Octadecyl tetrasodium 1,2 dicarboxyethyl sulfosuccinamate percent | 5 |
| Preferred mixture proportion vehicle to vitreous enamel color | 1:5.5 |

EXAMPLE 3

| | |
|---|---|
| "Carbowax" 6000 (polyethylene glycol having an average molecular weight of about 6000 to 7500; M.P. 58–62° C.) percent | 20 |
| "Siponol TX" (a mixed fatty alcohol made and sold by American Alcolac Corp.—$C_{12}$–$C_{14}$ 4%—$C_{16}$–$C_{18}$ 92%; M.P. 48–52° C.) percent | 75 |
| Sodium alkyl naphthalene sulfonate do | 5 |
| Preferred mixture proportion vehicle to vitreous enamel color | 1:4.8 |

EXAMPLE 4

| | |
|---|---|
| "Carbowax" 4000 (polyethylene glycol having an average molecular weight of 3000 to 7000; M.P. 50–55° C.) percent | 50 |
| "Dytol E-46" (fatty alcohol made and sold by Roehm & Haas Company and containing $C_{14}$ 1.2%—$C_{16}$ 34.7%—and $C_{18}$ 64.8%; M.P. 50–54° C.) percent | 45 |
| Octyl alcohol, sodium sulfate do | 5 |
| Preferred mixture proportion vehicle to vitreous enamel color | 1:4 |

EXAMPLE 5

| | |
|---|---|
| "Carbowax" 1540 (polyethylene glycol having an average molecular weight of 1300 to 1600; M.P. 40–45° C.) percent | 25 |

"Carbowax" 20,000 (polyethylene glycol having an average molecular weight of 15,000 to 20,000; M.P. about 60° C.) _____percent__ 15
Stearyl alcohol _____do____ 55
Sodium petroleum sulfonate (molecular weight 500) _____percent__ 5
Preferred mixture proportion vehicle to vitreous enamel color _____ 1:4.5

EXAMPLE 6

"Carbowax" 6000 (polyethylene glycol having an average molecular weight of 6000 to 7500; M.P. 58–62° C.) _____percent__ 30
Stearyl alcohol _____do____ 62
Sodium-N-hexadecanoyl-N-cyclohexyl taurate percent__ 5
Soya lecithin (for moisture condensation resistance) _____percent__ 3
Preferred mixture proportion vehicle to vitreous enamel color _____ 1:4.8

EXAMPLE 7

"Carbowax" 6000 (polyethylene glycol having an average molecular weight of 6000 to 7500; M.P. 58–62° C.) _____percent__ 30
Stearyl alcohol _____do____ 45
Carnauba wax North Country No. 3 double refined _____percent__ 20
Butyl naphthalene sodium sulfonate _____do____ 5
Preferred mixture proportion vehicle to vitreous enamel color _____ 1:5

EXAMPLE 8

"Carbowax" 6000 (polyethylene glycol having an average molecular weight of 6000 to 7500; M.P. 58–62° C.) _____percent__ 40
Stearyl alcohol _____do____ 59
Sodium heptadecyl sulfate _____do____ 1
Preferred mixture proportion vehicle to vitreous enamel color _____ 1:4

EXAMPLE 9

"Carbowax" 6000 (polyethylene glycol having an average molecular weight of 6000 to 7500; M.P. 58–62° C.) _____percent__ 20
Stearyl alcohol _____do____ 70
Sodium 2-ethyl hexyl sulfate _____do____ 10
Preferred mixture proportion vehicle to vitreous enamel color _____ 1:4.5

*Resin-wax vehicles*

EXAMPLE 10

Rosin _____percent__ 25
"Staybelite" (hydrogenated rosin produced by Hercules Powder Co.) _____percent__ 25
Stearic acid _____do____ 45
Sodium petroleum sulfonate (molecular weight 500) _____percent__ 5
Preferred mixture proportion vehicle to vitreous enamel color _____ 1:4

EXAMPLE 11

"Staybelite" (hydrogenated rosin produced by Hercules Powder Co.) _____percent__ 50
Stearic acid _____do____ 45
n-Octadecyl tetrasodium 1,2 dicarboxyethyl sulfosuccinamate _____percent__ 5
Preferred mixture proportion vehicle to vitreous enamel color _____ 1:5

EXAMPLE 12

"Polypale" resin (a resin prepared by polymerizing the unsaturated resin acids contained in rosin produced by Hercules Powder Co.) __percent__ 40
Stearic acid _____do____ 50
Ammonium sulfate of cetyl-stearyl alcohol _do____ 10
Preferred mixture proportion vehicle to vitreous enamel color _____ 1:4.5

EXAMPLE 13

"Staybelite" (hydrogenated rosin produced by Hercules Powder Co.) _____percent__ 50
Paraffin ("Sunoco Wax #5512") _____do____ 45
Sodium petroleum sulfonate (molecular weight 500) _____percent__ 5
Preferred mixture proportion vehicle to vitreous enamel color _____ 1:5

EXAMPLE 14

"Staybelite" (hydrogenated rosin produced by Hercules Powder Co.) _____percent__ 50
Stearyl alcohol _____do____ 45
Butyl naphthalene sodium sulfonate _____do____ 5
Preferred mixture proportion vehicle to vitreous enamel color _____ 1:5

EXAMPLE 15

"Staybelite" (hydrogenated rosin produced by Hercules Powder Co.) _____percent__ 25
"Polypale" resin (a resin prepared by polymerizing the unsaturated resin acids contained in rosin produced by Hercules Powder Co.) __percent__ 20
Stearyl alcohol _____do____ 45
Diethanolamine salt of half sulfate ester of cetyl-stearyl alcohol _____percent__ 10
Preferred mixture proportion vehicle to vitreous enamel color _____ 1:4

EXAMPLE 16

Ethylcellulose _____percent__ 2
"Carbowax" 6000 (polyethylene glycol having an average molecular weight of 6000 to 7500; M.P. 58–62° C.) _____percent__ 20
Stearyl alcohol _____do____ 73
Sodium sulfate, lauryl alcohol _____do____ 5
Preferred mixture proportion vehicle to vitreous enamel color _____ 1:4.5

EXAMPLE 17

"Carbowax" 6000 (polyethylene glycol having an average molecular weight of 6000 to 7500; M.P. 58–62° C.) _____percent__ 30
Hexadecanamide _____do____ 65
Magnesium salt of half sulfate ester of cetyl-stearyl alcohol _____percent__ 5
Preferred mixture proportion vehicle to vitreous enamel color _____ 1:4

The thermofluid vehicles of this invention may be produced with uniform characteristics from batch to batch and, when incorporated in a vitreous enamel color composition and applied on a ceramic or a metal surface in one or a plurality of layers of different colors, the vitreous enamel may be fused and the color compositions will have a self-smoothing character without running on the surface from the design in which they are stenciled thereon. In all cases, the color compositions of the present invention may be extruded through screen stencils for prolonged periods of time to give a clear-cut, sharp design. The resultant design may be fused to produce a firmly bonded smooth, glossy colored surface.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:
1. A thermofluid vehicle for vitreous enamel colors, self-smoothing and non-running at enamel fusing temperatures consisting essentially of (*a*) 20 to 50% by weight of a substance taken from the group consisting of polyethylene glycol having an average molecular weight of about 6,000 to 7,500, polyethylene glycol having an average molecular weight of about 3,000 to 7,000, and polyethylene glycol having an average molecular weight of about 1,300 to 1,600 in combination with polyethylene glycol having an average molecular weight of about 15,000 to 20,000, (b) 45% to 75% by weight of a saturated monohydroxy alcohol having 12 to 18 carbon atoms and (c) 1% to 10% of a sulfur-containing anionic surface active agent taken from the group consisting of sodium-N-hexadecanoyl-N-cyclohexyl taurate, n-octadecyl tetrasodium 1,2 dicarboxyethyl sulfosuccinamate, sodium alkyl naphthalene sulfonate, octyl alcohol, sodium sulfate, sodium petroleum sulfonate (molecular weight 500), butyl naphthalene sodium sulfonate, sodium heptadecyl sulfate, sodium 2-ethyl hexyl sulfate, ammonium sulfate of cetylstearyl alcohol.

2. A vitreous enamel color composition, self-smoothing and non-running at enamel fusing temperatures, consisting essentially of 4 to 6 parts by weight of a vitreous enamel color and 1 part by weight of a thermofluid vehicle consisting essentially of (a) 20 to 50% by weight of a substance taken from the group consisting of polyethylene glycol having an average molecular weight of about 6,000 to 7,500, polyethylene glycol having an average molecular weight of about 3,000 to 7,000, and polyethylene glycol having an average molecular weight of about 1,300 to 1,600 in combination with polyethylene glycol having an average molecular weight of about 15,000 to 20,000, (b) 45% to 75% by weight of a saturated monohydroxy alcohol having 12 to 18 carbon atoms and (c) 1% to 10% of a sulfur-containing anionic surface-active agent taken from the group consisting of sodium-N-hexadecanoyl-N-cyclohexyl taurate, n-octadecyl tetrasodium 1,2 dicarboxyethyl sulfosuccinamate, sodium alkyl naphthalene sulfonate, octyl alcohol, sodium sulfate, sodium petroleum sulfonate (molecular weight 500), butyl naphthalene sodium sulfonate, sodium heptadecyl sulfate, sodium 2-ethyl hexyl sulfate, ammonium sulfate of cetyl-stearyl alcohol.

References Cited in the file of this patent

UNITED STATES PATENTS

| | | |
|---|---|---|
| 2,190,210 | Kaber | Feb. 13, 1940 |
| 2,321,270 | Bacon et al. | June 8, 1943 |
| 2,561,010 | Carson | July 17, 1951 |
| 2,607,701 | Jessen | Aug. 19, 1952 |
| 2,607,702 | Jessen | Aug. 19, 1952 |
| 2,617,740 | Morris | Nov. 11, 1952 |

FOREIGN PATENTS

| | | |
|---|---|---|
| 552,719 | Great Britain | Apr. 21, 1943 |
| 669,987 | Great Britain | Apr. 9, 1952 |